No. 855,724. PATENTED JUNE 4, 1907.
S. L. McREYNOLDS.
YIELDING DRAFT ATTACHMENT FOR VEHICLES.
APPLICATION FILED SEPT. 13, 1906.

2 SHEETS—SHEET 1.

Witnesses

Inventor
S. L. McReynolds,
By
Attorneys

No. 855,724. PATENTED JUNE 4, 1907.
S. L. McREYNOLDS.
YIELDING DRAFT ATTACHMENT FOR VEHICLES.
APPLICATION FILED SEPT. 13, 1906.
2 SHEETS—SHEET 2.
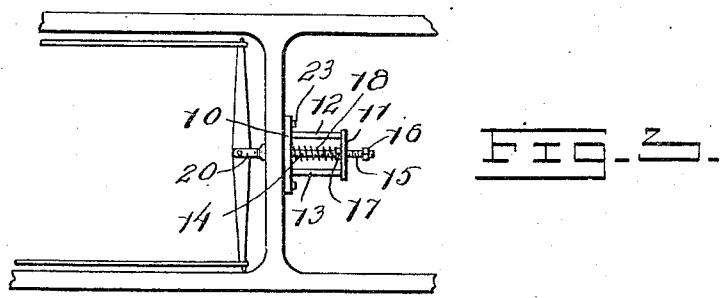
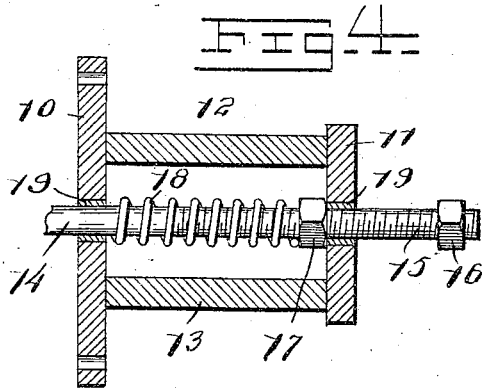

UNITED STATES PATENT OFFICE.

SAMUEL L. McREYNOLDS, OF BOISE, IDAHO.

YIELDING DRAFT ATTACHMENT FOR VEHICLES.

No. 855,724.  Specification of Letters Patent.  Patented June 4, 1907.

Application filed September 13, 1906. Serial No. 334,525.

*To all whom it may concern:*

Be it known that I, SAMUEL L. McREYNOLDS, a citizen of the United States, residing at Boise, in the county of Ada, State of Idaho, have invented certain new and useful Improvements in Yielding Draft Attachments for Vehicles; and I do hereby declare the following to be a full, clear, and exact description of the invention, such as will enable others skilled in the art to which it appertains to make and use the same.

This invention has relation to yielding draft attachments for vehicles for the prevention of sudden and rigid jerks in starting the vehicle or when the wheels meet with obstructions or "chuck holes" in their course.

To the foregoing ends, the invention is shown as embodied in the device illustrated in the annexed drawings, forming a part of this specification, in view of which the invention will first be described with respect to its construction and mode of operation, and then be pointed out in the subjoined claims.

Figure 1:
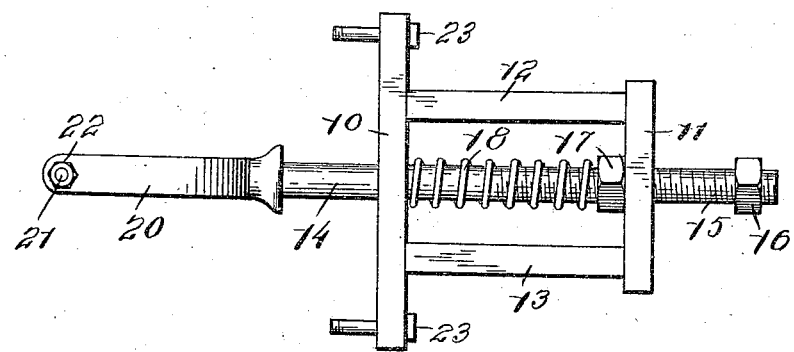
Figure 2:
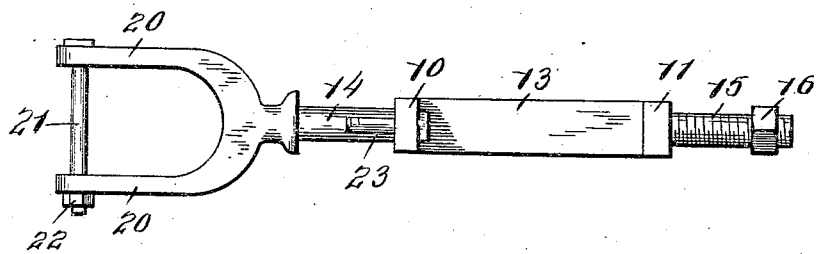

Of the said drawings, Figure 1 is a plan of the invention. Fig. 2 is a side elevation. Fig. 3 is a plan showing a swingletree attached to the invention and the connection of the swingletree with the draft-bar. Fig. 4 is a longitudinal section of the frame.

Similar numerals of reference designate similar parts or features, as the case may be, wherever they occur.

The means shown in the drawings as embodying the invention comprise a frame of substantially rectangular form in which 10 designates the front bar, 11 the rear bar, and 12 and 13 the side bars. A bolt 14, forked at its forward end so as to represent somewhat the form of a letter Y, has its shank projected through holes formed in the front and rear bars and is screw-threaded at its rear end 15 to receive a nut 16 that limits its forward movement. A nut 17 is turned on said bolt inside of the rear bar 11, and between the said nut and the forward bar 10 and coiled about the bolt is a stout helical spring 18, the tension of which is made adjustable by the nut 17. The holes in the front and rear bars of the frame through which the bolt 14 projects are provided with bushings 19 so as to provide against wear and to permit of the free movement of the bolt in said holes or bushings.

The forked or branching members 20—20 of the forward end of the bolt 14 have apertures formed through their ends, through which apertures is extended a headed bolt 21 having a nut 22 turned on its small end, the said bolt 21 being provided for the attachment of the swingletree to the bolt 14.

The ends of the forward bar 10 are extended beyond the side bars 13 and have holes formed through them longitudinally for the reception of bolts 23 by which the double-tree or draft-bar may be connected with the frame to keep the latter in place.

Under the structure described, in starting the vehicle the draft will be thrown upon the spring 18 and the forward movement will commence gradually, without jerk or jar, as in the case where the connection of the draft with the vehicle is rigid. The forward movement of the bolt 14 is limited by the nut 16 so that there is no liability of the buckling of spring 18 by reason of too great compression thereof. The connection with the swingletree may be made rigid by turning up the nut 16 on the bolt 14 so that both nuts 16 and 17 will be in contact with the rear bar 11.

By my invention a vehicle is made to run over uneven roads and over obstructions met with by the wheels, as well as to start from a stand-still without the unpleasant jerks and jars experienced when the connections are rigid.

What is claimed is:—

1. In a spring-draft attachment for vehicles, the combination with a frame having front and rear bars, a Y-shaped draft bolt extended through bush-bearings in said front and rear bars, a spring surrounding the bolt and bearing at its forward end against the forward bar of the frame and at its rear end upon connections with the bolt, and a bolt between the branching arms at the forward end of the draft bolt.

2. In a yielding draft attachment for vehicles, a frame having front and rear bars and bush-bearings therein, a draft bolt having branching arms at its forward end and extended through said bush-bearings, a spring surrounding said draft rod and bearing at its forward end against the forward bar and at its rear end against a connection with the bolt, a vertical bolt arranged between the branching arms at the forward end of the draft bolt, the ends of the forward bar of the frame being extended, and means connected with said extensions to connect the same with the means for pulling on the forward end of the draft bolt.

In testimony whereof, I affix my signature, in presence of two witnesses.

SAMUEL L. McREYNOLDS.

Witnesses:
G. F. McREYNOLDS,
CLARA C. McREYNOLDS.